Patented Dec. 15, 1936

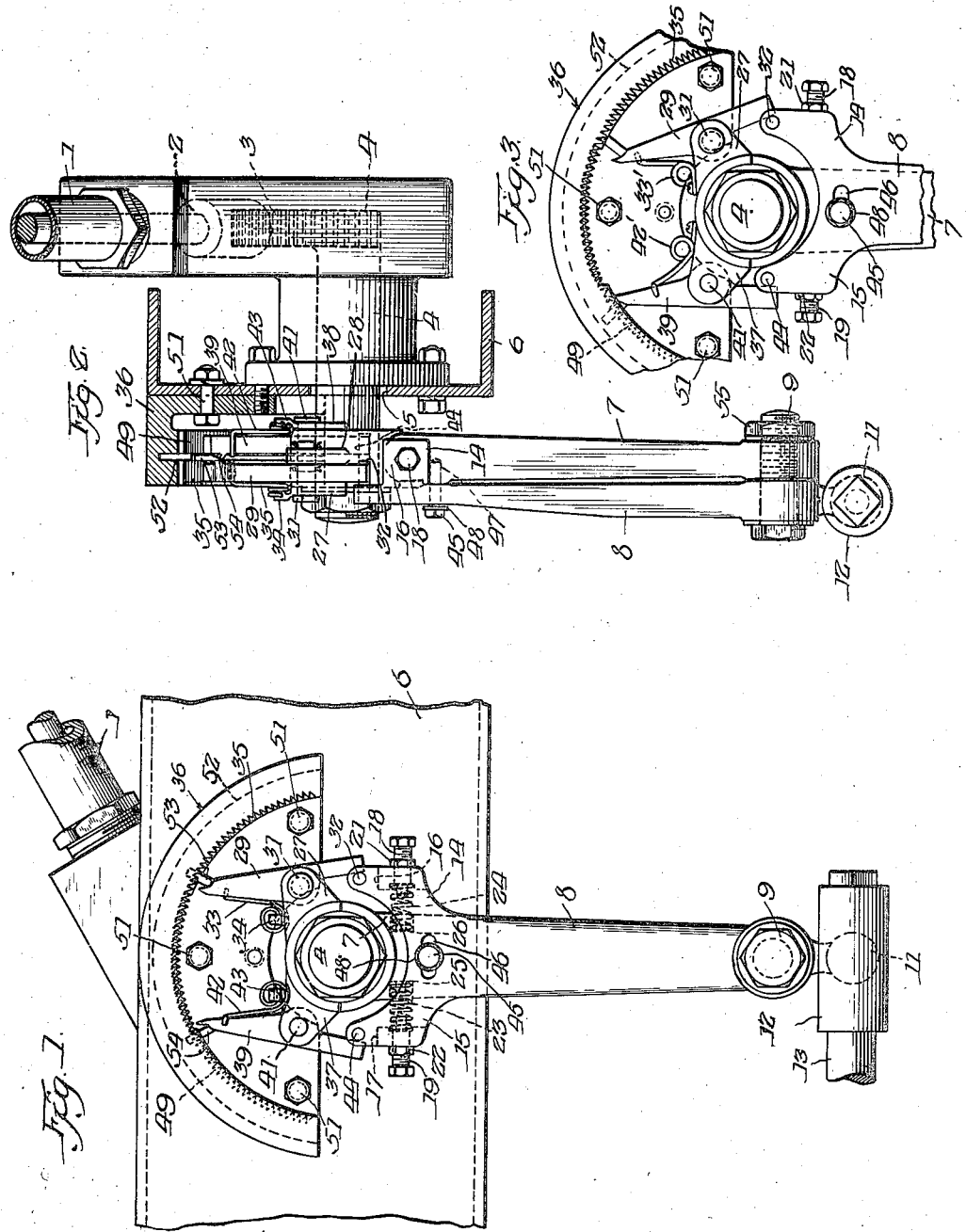

2,064,600

UNITED STATES PATENT OFFICE 2,064,600

STEERING CONTROLLER

Arthur A. Friestedt, McHenry, Ill.

Application May 15, 1933, Serial No. 671,154

14 Claims. (Cl. 280—89)

This invention pertains to improvements in steering mechanisms for vehicles and relates particularly to improvements in the control of steering.

Steering mechanisms for vehicles such as automobiles, trucks and busses usually are so constructed that while the front wheels ordinarily are readily steered and are under control of the steering wheel, road thrusts of various kinds also are able to turn the front wheels and in some cases they often deflect them so sharply as to wrench the control of the car from the driver. Newspapers frequently report fatal accidents resulting from blown-out front tires and from front wheels striking holes in pavements, causing the cars to swerve sharply to collide with other vehicles or to plunge off the roadways. This invention aims to provide apparatus enabling the driver to maintain control over the steering regardless of the sudden occurrence of unusual thrusts from the roadway upon the wheels.

Other objects of the invention include providing apparatus to make normal steering problems easier yet employing apparatus which is simply constructed and unlikely to get out of order, which is so inexpensive as to be available to all drivers of vehicles and generally to facilitate accurate steering of automobiles under all road conditions.

While it is appreciated that the invention is susceptible of embodiment in more than one form, the drawing and specification forming a part of this application discloses the principles of the invention as demonstrated by one preferred actual embodiment thereof with certain slight modifications additionally shown.

Fig. 1 of the drawing is a partial side elevation of the mechanism of the preferred embodiment, Fig. 2 is an end elevation of the controller mechanism partly in section, and Fig. 3 is a partial side elevation of the controller mechanism set to oppose turning of the running wheels to the right.

Referring now to the drawing, there is shown the usual steering column shaft 1 provided with a worm 2 meshing with a steering sector 3 mounted on the steering shaft 4. In steering mechanisms heretofore used the steering shaft and its associated sector and worm gear were mounted on the chassis frame, the steering shaft oftentimes extending through an aperture in the frame. In the present illustration, by way of illustration, it is shown extending through an aperture 5 in the chassis frame member 6. A steering arm 7 is splined on the outer end of the sector shaft, but, contrary to the usual practice, does not carry on its lower end a ball for connection to the drag link. Instead a control arm 8 pivotally mounted on a pin 9, the latter being threaded into and locked on the steering arm 7 by a nut as shown, carries on its lower end a ball 11 which is connected in the usual manner to a socket 12 at the end of the drag link 13. The drag link is then connected to the left and right steering knuckles in the usual manner, employing the usual tie rod which causes the two front wheels to operate simultaneously. Since that part of the mechanism is unchanged in this invention it need not be shown herewith. It is sufficient to say that in accordance with the usual constructions rearward motion of the drag link 13 will cause the right and left front wheels to turn to the right to cause the car to be propelled in that direction, whereas forward reciprocation of the drag link will cause the car to steer to the left.

The control arm 8 is free to move about the pivot pin 9 only a limited amount, it being provided with ears 14 and 15 which have side extensions 16 and 17 in which are mounted stop screws 18 and 19 provided with lock nuts 21 and 22. The inner ends of these stop screws butt against the sides of the steering arm whenever the control arm moves any predetermined amount out of alignment with the steering arm. Both for the purpose of cushioning the relative movement of these two arms and to tend to retard their relative movement there are provided compression springs 23 and 24 which rest in sockets 25 and 26 in opposite sides of the steering arm 7 and whose outer ends embrace the ends of the stop screws.

The steering arm 7 is provided on its right side with integral ears 27 and 28 between which is carried a pawl 29 pivotally connected thereto by a pin 31. The ears 27 and 28, being integral with the steering arm 7, rotate therewith whenever the driver of the car rotates the steering wheel and causes the sector shaft 4 thereby to rotate. The upper part of the ear 14 carries a pin 32 against which the lower end of the pawl abuts, being urged into that abutting relation by means of a coiled spring 33 mounted to press against the pawl and whose other end is anchored in a boss 34 carried also on the ear 27. Hence when the control arm and steering arm are in a parallel relationship the pawl 29 will not be engaged with the teeth 35 of the rack 36.

On the other side of the steering arm is another pair of ears 37 and 38 between which is mounted the pawl 39 on the pin 41. In a similar manner a spring 42 anchored in a boss 43 continuously urges the upper end of the pawl outwardly and causes its lower end to be pressed firmly against a pin 44 carried by the ear 15.

A cap screw 45 passes through a slotted aperture 46 in the steering control arm and is threaded clear to the bottom of a hole 47 in the steering arm 7, being provided with a washer 48 to facilitate a sliding relationship between the two arms but preventing road shocks to cause one to chatter against the other.

It will be noted that the pawl 39 may engage with the teeth 49 whenever the pin 44 moves to the right, viewing Fig. 1, and that these latter teeth are inclined oppositely to the teeth 35. In view of the fact that the steering arm 7 may rotate nearly 45° in either direction from the vertical, the arcuate extent of the two rows of teeth which are oppositely inclined must overlap, and are so shown to overlap in the upper central part of the rack. The rack 36 itself is preferably made in one piece and fastened immovably to the chassis frame in any suitable manner as, for example, by means of bolts 51. The rack teeth and the points of the pawls are preferably so shaped that when either pawl is engaged with the teeth it may be disengaged by rotation about its pivot point without requiring that the pivot point be moved back to facilitate withdrawal of the pawl. In between the two rows of oppositely inclined teeth there is provided a groove 52 in which slides at all times pawl guides 53 and 54 integral with the pawls and offset therefrom so that they will ride in the groove, thus preventing the pawls from vibrating out of proper alignment with the rack teeth.

A suitable nut 55 on the bolt 9 cooperates with the threaded connection of the pin and arm 7 to lock them together and at the same time position the head of the bolt so that the control arm will pivot freely without too much longitudinal motion along the bolt.

The stop screws 18 and 19 are reduced at their inner ends to provide pilot points inside of the compression springs and shoulders for abutting the ends of the compression springs which enable the stop screws to vary the tension on these springs. By employing strong springs the control arm and steering arm will remain approximately parallel under the thrusts which they receive during normal driving conditions, serving thereby to prevent either pawl from becoming engaged with the rack. Hence only unusual road thrusts or unusual pulls on the steering wheel will cause a sufficient relative deflection of these two arms to cause either pawl to become engaged.

On the other hand, by employing weaker springs the two arms will be displaced by rather slight pressures thus allowing the pawls to thereby become engaged.

The stop screws should be set to permit the pawls to swing into firm engagement with the rack teeth. However, the stop screws may be run in far enough to prevent either pawl from becoming engaged and thereby at the will of the operator taking this control mechanism out of service.

The device operates as follows. A clockwise pull on the steering wheel by the driver will rotate the lower end of the steering arm 7 rearwardly from its vertical position. Its thrust will be exerted through the pin 9 upon the lower end of the control arm 8. The drag link 13 will oppose this thrust. Assuming that the thrust is strong enough to overcome the centering springs, the upper end of the control arm will move off center to the right and the pin 44 will move away from its associated pawl 39. The latter pawl will then engage the rack teeth and further continued hard pulling of the wheel in the right hand direction (clockwise) will keep the pawl 39 engaged with the teeth while the arms 7 and 8 thereafter move in unison (but out of parallel alignment) rearwardly, causing the car to steer to the right. Fig. 3 shows the non-parallel relation of the control arm and the steering arm at the start of turning the running wheels to the right from a straight ahead position before the steering arm leaves its neutral vertical position. The pawl 39 is at this time already set. During this time while the normal road pressure on the wheels may tend to straighten them out and exert a forward pull on the drag link 13, the opposing forces on the drag link and steering wheel will hold the pin 44 away from the pawl 39, retaining the pawl in engagement with the teeth, the pawl readily preventing any forward motion of the lower end of the steering arm despite the pull in that direction being exerted by the drag link acting through the ball and socket joint and on the pin 9. Thus so long as the driver holds the wheel to the right hard enough to keep the spring 24 compressed the car cannot turn to the left but must continue to the right.

However, when the mechanism happens to be under the conditions above described if the right front tire should blow out or the right front wheel strike a hole in the pavement, tending to make the car steer by reason of that thrust more sharply to the right, a strong rearward thrust would be exerted upon the drag link immediately and this would cause the upper end of the control arm to kick forwardly, or to the left, viewing Fig. 1, releasing the pawl 39 which was heretofore preventing a left turn and setting the pawl 29, thus preventing the car from veering to the right any further than its wheels were set at the time the thrust was received. Even if a blown-out right front tire be the cause of this sudden rearward thrust upon the drag link the pawl 29 acting through the ears which hold it on the steering arm 7 will prevent any further turning of the wheels to the right. The driver, however, can, if he desires, voluntarily steer the car more sharply to the right merely by pulling the wheel hard to the right sufficient to overcome the rearward thrust of the drag link and restore the two arms to parallel alignment, or hard enough to reverse their relative positions and set the pawl 39 which opposes only left hand turning of the wheels.

Should the driver, while the pawl 29 is still set by reason of the strong rearward thrust on the drag link, desire to steer to the left he may do so as the right hand pawl 29 would not prevent a left turn of the wheel. The pawl 29 would merely ratchet down over the teeth, opposing at each instant any tendency of the wheels to veer sharply to the right but permitting the driver to pull them to the left if he were able to overcome the existing road thrust.

It should be obvious that if the same set of conditions arose while the car was steering to the left, the driver would in a similar manner be able to maintain his control over the car and voluntarily increase the left turn or decrease it.

Should the accident occur when the wheels are steering straight ahead and the steering arm 7 is vertical, it will be understood now how the sudden thrust on the drag link either to the rear or forwardly will set whichever pawl is required to prevent any further such undesired movement of the drag link. It should be equally obvious how the driver can overcome whatever setting the pawls may have merely by turning the steering wheel in the direction in which he naturally desires to turn the car at any particular instant. He is not required at any time to reverse the wheel temporarily to disengage a pawl. The fact is that he will merely continue to operate the steering wheel in the manner to which he has heretofore been accustomed and need not change his mode of steering at all. The device facilitates easy steering, makes possible safe steering and does not produce any complications in steering.

In some of the present steering mechanisms for automobiles, when a car is steering around a sharp curve, for example, as at street intersections, the wheels have a strong tendency to straighten out, that is, to align themselves parallel to the chassis. While maintaining the wheels deflected to go around the corner the driver under such circumstances must maintain a pull on the wheels strong enough to overcome the thrust on the drag link produced by this straightening out tendency. Provided the centering springs 23 and 24 are not too stiff, the opposing pull on the steering wheel and the straightening out thrust on the drag link will set the particular pawl which will stop the straightening out tendency so long as the steering arm and control arm are kept out of alignment in that particular relation. The pawl will therefore carry the thrust of the straightening out tendency and the driver need only maintain enough pressure on the wheel to keep the centering spring compressed which is on the same side of the steering arm as the set pawl is. Thus steering around sharp corners is made easier by this invention. To enable the car to straighten itself out when the turn has been sufficiently completed the driver will merely turn the wheel to the left fast enough to keep left centering spring from compressing to such an extent as would allow the right pawl to set. If the centering springs be strong enough, a slight left pull on the wheel will release the right pawl, the two arms will become restored to and maintained in parallel alignment merely by the springs and thereafter the normal straightening out tendency of the wheels can take place.

Fig. 3 shows a slightly different manner of mounting the pawl springs. Coiled springs 42' and 33' are anchored onto the tops of ears 37 and 27 by screws as shown. Other forms of springs or spring mountings obviously can be used.

The present disclosure is intended to portray the invention only in one selected embodiment. Other modifications will suggest themselves and may be employed without, however, departing from the spirit and scope of the invention, especially as it is defined in the appended claims.

Having shown and described the invention, I claim:

1. In a vehicle steering apparatus including a drag link for steering dirigibly mounted running wheels, a steering arm mounted for oscillation about a fixed pivot, a lever pivotally connected to said arm and operatively connected to said link below and removed from said pivotal connection, means for resiliently limiting the pivotal movement of said lever relatively to said arm, means controlled by said relative movement for stopping oscillation of said arm in a given direction including a rack having teeth arranged on an arc concentric with said fixed pivot and pawls bodily carried on said arm, and means on the lever for engaging said pawls.

2. In a vehicle steering apparatus, a reciprocable drag link, a rotatable shaft and an arm fixed thereon, a lever pivoted on said arm remotely from said shaft, means resiliently restraining pivotal movement of said lever about said pivot, means including a stationary toothed rack member and operative upon pivotal movement of said lever only in excess of a predetermined angle for establishing resistance to the rotation of said shaft in a given direction, and means connecting said lever and drag link, the whole being arranged for reciprocation of the link through the arm and lever by rotation of the shaft, said resilient means being adjusted and mounted for cushioning the rotative force upon said shaft exerted by ordinary road thrusts on said link and preventing said rotation in excess of said angle by said thrusts.

3. In a vehicle steering apparatus, a reciprocable drag link, a rotatable shaft and an arm fixed thereon, a lever pivoted on said arm remotely from said shaft, means resiliently restraining pivotal movement of said lever about said pivot, means including a stationary rack having teeth on an arc concentric with said shaft and pawls bodily movable with said arm actuated by pivotal movement of said lever in excess of a predetermined angle for locking said shaft against rotation in a given direction, and means connecting said lever and drag link, the whole being arranged for reciprocation of the link through the arm and lever by rotation of the shaft, said resilient means being adjusted and mounted for cushioning the rotative force upon said shaft exerted by ordinary road thusts on said link.

4. In a vehicle steering apparatus, a reciprocable drag link, a rotatable shaft and manual steering wheel connections for rotating the shaft, means including a resilient device operatively connecting said shaft and link for steering the vehicle and constructed for resiliently cushioning ordinary steering and road thrusts between the shaft and link, and means operated by said device only under the force of extreme shocks of dangerous proportions received by the device for thereupon positively locking said shaft against movement in a given direction.

5. In a vehicle steering apparatus, a shaft rotatable on a fixed axis, manual steering means for rotating said shaft, an arm fixed on said shaft depending therefrom, a lever pivotally connected to said arm near the lower ends of both lever and arm, a steering drag link for connection with the running wheels of the vehicle pivotally connected with said lever near but not at the first said pivotal connection, means for resiliently resisting pivotal movement of the lever relatively to said arm, a stationary check member, and means for engaging said member controlled by pivotal movement of the lever relatively to the arm in excess of a predetermined amount for restraining rotation of said shaft, said resilient means being adjusted to hold inoperative said restraining means when subject only to ordinary steering or road thrusts which do not interfere with safe manual steering but allowing actuation of said restraining means upon the occurrence of extraordinary dangerous thrusts of sufficient force to render manual steering unsafe.

6. In a vehicle steering apparatus, a reciprocable drag link, a rotatable shaft and an arm fixed thereon, a lever pivoted on said arm remotely from said shaft, means resiliently restraining pivotal movement of said lever about said pivot, means including a stationary member concentrically arranged about said shaft actuated by pivotal movement of said lever in excess of a predetermined angle for establishing resistance to the rotation of said shaft in a given direction, and means connecting said lever and drag link, the whole being arranged for reciprocation of the link through the arm and lever by rotation of the shaft, said resilient means being adjusted and mounted for cushioning the rotative force upon said shaft exerted by ordinary road thrusts on said link.

7. In a vehicle steering apparatus, a reciprocable drag link, a rotatable shaft and an arm fixed thereon, a lever pivoted on said arm remotely from said shaft, means resiliently restraining pivotal movement of said lever about said pivot, means including a stationary member concentrically arranged about said shaft actuated by pivotal movement of said lever in excess of a predetermined angle for locking said shaft against rotation in a given direction, and means connecting said lever and drag link, the whole being arranged for reciprocation of the link through the arm and lever by rotation of the shaft, said resilient means being adjusted and mounted for cushioning the rotative force upon said shaft exerted by ordinary road thrusts on said link.

8. In a vehicle steering apparatus, a reciprocable drag link, a rotatable shaft and manual steering wheel connections for rotating the shaft, means including a resilient device operatively connecting said shaft and link for steering the vehicle and constructed for resiliently cushioning ordinary thrusts between the shaft and link, and means including a stationary member concentrically arranged about said shaft operated by said device only under the force of extreme shocks of dangerous proportions received by the device for thereupon locking said shaft against movement in a given direction.

9. In a vehicle steering apparatus including a drag link for steering dirigibly mounted running wheels, the combination of an arm oscillatable about a fixed axis, and means for manually oscillating said arm, a lever pivotally connected to said arm and link at longitudinally spaced points both remote from said axis, means for limiting pivotal movement of said lever relatively to said arm, a stationary rack having teeth arranged on an arc concentric with said axis, a pair of pawls mounted for bodily movement with said arm, and means controlled by movement of the lever relatively to the arm for controlling engagement of said pawls with said rack.

10. In combination with a vehicle steering apparatus including running wheels dirigibly mounted for steering the vehicle and a steering wheel for actuating the steering mechanism, the combination of a pair of pivoted arms one mounted at one end on a fixed pivot connected for movement by the steering wheel and the other connected to the running wheels pivotally mounted on the free end of the first arm and bodily movable therewith, a stationary toothed rack, and means for engaging the teeth of said rack for stopping further rotative movement of one of said arms in a given direction actuated by pivotal movement in excess of a predetermined magnitude of one arm relatively to the other.

11. A steering apparatus comprising a shaft and means for manually rotating it, an arm fixed on said shaft, a lever pivoted between its ends near the free end of said arm, a drag link for steering dirigibly mounted running wheels and connected to one end of said lever, resilient means bearing on the other end of said lever cushioning the rotative movement of the lever relatively to said arm, a stationary rack, and means bodily movable with the arm and lever in their normal steering movements normally inoperative during normal steering movements but operable upon excessive pivotal movement of the lever relatively to the arm for engaging said rack to positively prevent rotation of the shaft in a given direction.

12. In combination with a vehicle steering apparatus including a drag link for steering dirigibly mounted running wheels, an arm manually rotatable about a stationary axis, a lever pivotally supported on said arm and connected with said link, a stationary check member, means actuated by predetermined pivotal movement of the lever relatively to the arm for engaging said member for restraining pivotal movement of said arm about its axis, and means resiliently damping relative pivotal movement of the arm and lever adjusted to absorb ordinary steering and road thrusts transmitted from the link to the lever and permitting said predetermined pivotal movement only upon occurrence of extraordinarily powerful and dangerous road thrusts.

13. In combination with a vehicle steering apparatus including a drag link for steering dirigibly mounted running wheels and a manually operable steering wheel, an arm rotatable about a stationary axis by means of said steering wheel, a lever pivotally supported on said arm and connected with said link, resilient means restraining relative pivotal movement of the lever and arm serving to cushion ordinary road shocks transmitted from said link toward the steering wheel, a stationary toothed rack, and means engageable with the teeth of said rack upon relative movement of the arm and lever caused by road thrusts of dangerous proportions exceeding ordinary road thrusts for opposing the tendency of said arm to rotate responsive to said thrusts.

14. In a vehicle steering apparatus, a reciprocable drag link, a rotatable shaft and steering connections for rotating the shaft, an arm fixed on said shaft, a lever pivoted on said arm remotely from said shaft and connected to said link, means normally restraining pivotal movement of the lever relatively to the arm under normal steering stresses but yieldable under abnormal stresses exceeding a predetermined force, a stationary check member, and means for checking the rotation of said shaft in a given direction normally out of engagement with said member but engageable therewith upon pivotal displacement of the lever relatively to the arm in excess of a predetermined angle.

ARTHUR A. FRIESTEDT.